(12) United States Patent
Haruna et al.

(10) Patent No.: US 7,682,644 B2
(45) Date of Patent: Mar. 23, 2010

(54) FAT AND OIL COMPOSITION FOR SPREADS

(75) Inventors: Hirofumi Haruna, Yokosuka (JP);
Hiroko Nakahara, Yokosuka (JP);
Atsushi Ohara, Yokosuka (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 892 days.

(21) Appl. No.: 10/527,416

(22) PCT Filed: Oct. 29, 2003

(86) PCT No.: PCT/JP03/13840

§ 371 (c)(1),
(2), (4) Date: Mar. 11, 2005

(87) PCT Pub. No.: WO2004/039165

PCT Pub. Date: May 13, 2004

(65) Prior Publication Data

US 2006/0062887 A1    Mar. 23, 2006

(30) Foreign Application Priority Data

Oct. 31, 2002 (JP) ............................ 2002-317985

(51) Int. Cl.
*A23D 9/00* (2006.01)
(52) U.S. Cl. ...................... 426/606; 426/601
(58) Field of Classification Search .................. 426/607
See application file for complete search history.

(56) References Cited

U.S. PATENT DOCUMENTS

| | | | |
|---|---|---|---|
| 3,949,105 A * | 4/1976 | Wieske et al. | 426/607 |
| RE30,086 E * | 8/1979 | Carlile et al. | 426/603 |
| 4,386,111 A * | 5/1983 | Van Heteren et al. | 426/603 |
| 4,396,639 A * | 8/1983 | Bodor et al. | 426/603 |
| 4,404,231 A * | 9/1983 | den Hollander et al. | 426/602 |
| 4,533,561 A * | 8/1985 | Ward | 426/603 |
| 4,952,606 A * | 8/1990 | Babayan et al. | 514/552 |
| 4,960,544 A * | 10/1990 | Van Putte et al. | 554/208 |
| 5,000,975 A * | 3/1991 | Tomarelli | 426/602 |
| 5,380,544 A * | 1/1995 | Klemann et al. | 426/607 |
| 5,468,507 A * | 11/1995 | Czap | 426/99 |
| 5,667,837 A * | 9/1997 | Broomhead et al. | 426/603 |
| 5,733,594 A * | 3/1998 | Hirose et al. | 426/611 |
| 5,858,445 A * | 1/1999 | Huizinga et al. | 426/607 |
| 5,869,125 A * | 2/1999 | Lynch et al. | 426/603 |
| 6,156,370 A * | 12/2000 | Huizinga et al. | 426/607 |
| 6,808,737 B2 * | 10/2004 | Ullanoormadam | 426/603 |

FOREIGN PATENT DOCUMENTS

| | | |
|---|---|---|
| DE | 28 32 636 A1 | 3/1980 |
| EP | 0 831 711 | 12/1999 |
| GB | 1139550 * | 1/1960 |
| JP | 04-058892 | 2/1992 |
| JP | 09-224570 | 9/1997 |
| JP | 09-241672 | 9/1997 |
| JP | 10-165093 | 6/1998 |
| JP | 10-243793 | 9/1998 |
| JP | 11-1698073 | 6/1999 |
| JP | 2002-500601 | 1/2002 |
| WO | WO 98/54061 | 12/1998 |

OTHER PUBLICATIONS

Berger, K. G. 1981. Porim Technology Palm Oil Research Institute Malaysia No. 5, Aug. 1981, p. 1-7.*
Heydinger, J. A. 1996. J. of Food Lipids 3:251-257.*
List, 1995. JAOCS 72(3)379-382.*
Ghosh, S. 1997. JAOCS 74(5)589-592.*
Young, F. 1983. JAOCS 60(2)326A.*
(Supplementary European Search Report).

* cited by examiner

*Primary Examiner*—Carolyn A Paden
(74) *Attorney, Agent, or Firm*—Michaelson & Associates; Peter L. Michaelson; Aubrey L. Helms, Jr.

(57) ABSTRACT

An object of the present invention is to provide a fat and oil composition for spreads having good oral solubility and spreadability without greasiness. A fat and oil composition for spreads of the present invention is composed of a continuous fat and oil phase and a water phase, characterized in that the fat and oil phase comprises (a) a liquid-state fat and oil containing, as a main ingredient, triglycerides having fatty acids with 8 to 10 carbon atoms in an amount of not less than 10% by mass of the total constitutional fatty acids; (b) a low melting transesterified fat and oil obtained by subjecting 40 to 90 parts by mass of the palm based fat and oil and 60 to 10 parts by mass of a liquid-state fat and oil to transesterification with a 1,3-position-specific lipase; and (c) a solid-form fat and oil having an open-tube melting point under increasing temperature of 38° C. or higher.

8 Claims, No Drawings

FAT AND OIL COMPOSITION FOR SPREADS

TECHNICAL FIELD

The present invention relates to a fat and oil composition for spreads, and more specifically, a fat and oil composition for spreads having good oral solubility and spreadability without greasiness.

BACKGROUND ART

Generally in the market of a fat and oil composition for spreads such as margarine, prepared margarine, and fat spread, good flavored products tend to be fond of. Particularly, spread-type margarine or the like for use in spreading on bread is generally composed of a high melting point fat and oil (e.g., a fat and oil having open-tube melting point under increasing temperature is 38° C. or higher), a middle melting point fat and oil (e.g., a fat and oil having open-tube melting point under increasing temperature in the range of 30 to 38° C.), and a liquid-state fat and oil (a fat and oil being liquid state at normal temperature). Margarine or the like is stored in a refrigerator when not in use and taken out from the refrigerator when used. To improve the spreadability (easy to spread) of margarine such that it may be spread on bread immediately upon taking out from a refrigerator, it is desired to increase the content of a liquid-state fat and oil, thereby attaining softness at low temperature.

However, when high priority is put on softness at low temperature in order to improve spreadability at low temperature, liquid-state fat and oil is separated off in the surface when margarine is left alone at room temperature or when margarine is stored back and forth between a refrigerator and room temperature. This phenomenon is called "oil-off". In addition to this, a phenomenon where grains called "graining" generates easily occurs. These phenomena are problems since they significantly reduce the commercial value of margarine.

To solve the aforementioned problems, Japanese Patent-Laid Open No. 9-241672 discloses a fat and oil obtained from a fat and oil (raw material) prepared by nonselectively transesterifying an oil mixture containing a liquid-state fat and oil, a fat and oil derived from palm oil, and laurin based oil. However, the fat and oil disclosed in the above document has a problem in that firmness significantly varies depending upon temperature change.

Japanese Patent-Laid Open No. 10-243793 discloses a plastic fat and oil composition obtained by subjecting a liquid state fat and oil and an extremely hydrogenated oil to a position-specific transesterification process. However, in the fat and oil composition disclosed in the above document, the resultant product is greasy. Thus, it may not be said that the composition has sufficient properties.

Japanese National Publication of International Patent Application No. 11-500318 discloses a spread containing a palm based fat and oil and a chemically modified (hydrogenated, transesterified) fat and oil so as to have a specific triglyceride composition ratio. However, the spread disclosed in the above document has a feature of suppressing particle generation; however, it does not have features of improved oral solubility, greasiness and spreadability.

It may not be said that the fat and oil compositions disclosed in the aforementioned documents have good oral solubility and spreadability without greasiness. In the circumstances, it has been desired to develop a fat and oil composition having these features.

Furthermore, Japanese Patent-Laid Open No. 9-224570 discloses edible oil using palmstearin, and shortening and margarine using the edible oil as a raw material. The edible oil disclosed in the above document is excellent in oxidation stability and the like. However, it is further desired to develop a fat and oil composition improved in property for a fat and oil for spreads.

SUMMARY OF THE INVENTION

Accordingly, an object of the present invention is to provide a fat and oil composition for spreads having good oral solubility and spreadability without greasiness.

DETAILED DESCRIPTION OF THE INVENTION

The inventors of the present invention carried out an in-depth study. As a result, they found that the aforementioned object can be accomplished by preparing a fat and oil phase constituting a fat and oil composition for spreads from a specific fat and oil.

The present invention has been accomplished based on the aforementioned finding. According to the present invention, there is provided a fat and oil composition for spreads composed of a continuous fat and oil phase and a water phase, characterized in that the fat and oil phase comprises (a) a liquid-state fat and oil containing, as a main ingredient, a triglyceride having fatty acids with 8 to 10 carbon atoms in an amount of not less than 10% by mass of the total constitutional fatty acids; (b) a low melting transesterified fat and oil obtained by subjecting 40 to 90 parts by mass of a palm based fat and oil and 60 to 10 parts by mass of a liquid-state fat and oil to transesterification with a 1,3-position-specific lipase; and (c) a solid-form fat and oil having an open-tube melting point under increasing temperature of 38° C. or higher.

The fat and oil composition for spreads according to the present invention has good oral solubility and spreadability without greasiness.

The term "a composition composed of a continuous fat and oil phase and a water phase" means a fat and oil composition having the water phase within the fat and oil phase, that is, a fat and oil composition of a water-in-oil (W/O type) emulsion.

The ratio of the water phase to the fat and oil phase is preferably 10 to 100 parts by mass to 100 parts by mass.

The term "a fat and oil composition for spreads" means a general term of a composition containing fat and oil components for spreading on food and the like when it is used, including margarine, prepared margarine, and fat spread.

In a fat and oil composition for spreads according to the present invention, it is preferable that the content of the liquid-state fat and oil (a) is 40 to 70% by mass of the total mass of the fat and oil phase, the content of the low melting transesterified fat and oil (b) is 5 to 50% by mass of the total mass of the fat and oil phase, and the content of the solid-form fat and oil (c) is 5 to 40% by mass of the total mass of the fat and oil phase.

In a fat and oil composition for spreads according to the present invention, it is preferable that the triglyceride, as a main ingredient of the liquid-state fat and oil (a) comprises a triglyceride having fatty acids with 8 to 10 carbon atoms bound to the 1-, 2- and 3-positions; a triglyceride having fatty acids with 8 to 10 carbon atoms bound to the 1-,and 2-positions; a triglyceride having fatty acids with 8 to 10 carbon atoms bound to the 1-, and 3-positions; a triglyceride having a fatty acid with 8 to 10 carbon atoms bound to the 1-position; or a triglyceride having a fatty acid with 8 to 10 carbon atoms bound to the 2-position.

The triglyceride as a main ingredient of the liquid-state fat and oil (a) may have only fatty acids with 8 carbon atoms and/or 10 carbon atoms bound therein.

In a fat and oil composition for spread according to the present invention, the low melting transesterified fat and oil (b) has an open-tube melting point under increasing temperature of, preferably, 20 to 32° C.

In a fat and oil composition for spreads according to the present invention, it is preferable that the solid-form fat and oil (c) is an animal fat and oil or a vegetable fat and oil, or a hydrogenated oil, fractionated oil or transesterified oil of the animal fat and oil and the vegetable fat and oil.

Furthermore, the present invention provides a fat and oil composition comprising (a) a liquid-state fat and oil containing, as a main ingredient, a triglyceride having fatty acids with 8 to 10 carbon atoms in an amount of not less than 10% by mass of the total constitutional fatty acids; (b) a low melting transesterified fat and oil obtained by subjecting 40 to 90 parts by mass of a palm based fat and oil and 60 to 10 parts by mass of a liquid-state fat and oil to transesterification with a 1,3-position-specific lipase; and (c) a solid-form fat and oil having an open-tube melting point under increasing temperature of 38° C. or higher.

BEST MODE FOR CARRYING OUT THE INVENTION

A fat and oil composition for spreads according to the present invention will be described below.

A fat and oil composition for spreads of the present invention is composed of a fat and oil phase and water phase in continuous form, characterized in that the fat and oil phase comprises (a) a liquid-state fat and oil containing, as a main ingredient, a triglyceride having fatty acids with 8 to 10 carbon atoms in an amount of not less than 10% by mass of the total constitutional fatty acids; (b) a low melting transesterified fat and oil obtained by subjecting 40 to 90 parts by mass of a palm based fat and oil and 60 to 10 parts by mass of a liquid-state fat and oil to transesterification with a 1,3-position-specific lipase; and (c) a solid-form fat and oil having an open-tube melting point under increasing temperature of 38° C. or higher.

First, a liquid-state fat and oil, containing, as a main ingredient, a triglyceride, which is the component (a) constituting the fat and oil phase, will be described. The triglyceride, which is a main ingredient of the liquid-state fat and oil (a), has fatty acids with 8 to 10 carbon atoms in an amount of not less than 10% by mass of the total constitutional fatty acids. The liquid-state fat and oil of the component (a) is characterized by being a liquid state, at a temperature of 20° C., where no solid matter is visually observed. As an example of a fatty acid with 8 carbon atoms, there can be mentioned caprylic acid. As an example of a fatty acid with 10 carbon atoms, there can be mentioned capric acid.

If the content of fatty acids with 8 to 10 carbon atoms is not less than 10% by mass of the constitutional fatty acids of a triglyceride serving as an main ingredient of the liquid fat and oil of the component (a), the resultant fat and oil composition for spreads exhibits good oral solubility and non fatty taste.

As a specific example of a triglyceride serving as a main ingredient of the component (a), there can be mentioned a medium chain triglyceride. Furthermore use may be made of a middle chain triglyceride that is mixed with or transesterified with one or two types of elements selected from the group consisting of rapeseed oil, soybean oil, corn oil, cottonseed oil, rice bran oil, safflower oil, sunflower oil, palm olein and hydrogenated, fractionated or transesterified products of these. Moreover, use may be made of an oil mixture of a middle chain triglyceride and a transesterified middle chain triglyceride as mentioned above.

The middle chain triglyceride refers to one whose constitutional fatty acids all substantially have 8 to 10 carbon atoms. The term "substantially" means that a small amount of side product(s) generated during a reaction is not taken into consideration. As the middle chain triglyceride, mention is made of a triglyceride containing about 75% by mass of a fatty acid having 8 carbon atoms and about 25% by mass of a fatty acid having 10 carbon atoms. Such a triglyceride is commercially available from, for example, ODO (manufactured by The Nisshin OilliO Group, Ltd.).

The ratio of a fatty acid having 8 to 10 carbon atoms contained in a triglyceride, which is a main ingredient of a liquid-state fat and oil contained in the fat and oil phase constituting a fat and oil composition for spreads of the present invention, is 10 to 100% by mass, preferably, 18 to 100% by mass, more preferably 30 to 100% by mass, further preferably 50 to 100% by mass, and most preferably, 80 to 100% by mass. Furthermore, substantially all fatty acids contained in the triglyceride may be those having 8 to 10 carbon atoms.

A triglyceride serving as a main ingredient of the component (a) may be sufficient if it is contained in an amount of not less than 10% by mass. As an example of such a triglyceride, there can be mentioned a triglyceride having fatty acids with 8 to 10 carbon atoms bound to the 1-, 2- and 3-positions, a triglyceride having fatty acids with 8 to 10 carbon atoms bound to the 1- and 2- positions, a triglyceride having fatty acids with 8 to 10 carbon atoms bound to the 1- and 3-positions, a triglyceride having a fatty acid with 8 to 10 carbon atoms bound to the 1-position; or a triglyceride having a fatty acid with 8 to 10 carbon atoms bound to the 2-position.

The content of a liquid-state fat and oil of the component (a) contained in the fat and oil phase of a fat and oil composition for spreads according to the present invention is preferably 40 to 70% by mass of the total mass of the fat and oil phase, more preferably 45 to 65% by mass, further preferably 50 to 60% by mass, and most preferably 52 to 58% by mass. If the content of the liquid-state fat and oil of the component (a) is less than 40% by mass of the total mass of the fat and oil phase, the fat and oil composition sometimes exhibits decreased spreadability during refrigeration, poor oral solubility and greasiness. On the other hand, if the content of the liquid-state fat and oil exceeds 70% by mass, a sufficient firmness cannot be obtained and oil-off is easily taken place in some cases.

The component (b) mentioned above will now be described. The component (b) is a low melting transesterified fat and oil obtained by subjecting 40 to 90 parts by mass of a palm based fat and oil and 60 to 10 parts by mass of a liquid-state fat and oil to transesterification with a 1,3-position-specific lipase. The low melting transesterified fat and oil refers to one having an open-tube melting point under increasing temperature of preferably 20 to 32° C.

If the open-tube melting point under increasing temperature of the low melting transesterified fat and oil is less than 20° C., the fat and oil composition for spreads becomes too soft when temperature rises, sometimes causing oil-off. On the other hand, if the open-tube melting point under increasing temperature is higher than 32° C., the spread fat and oil composition becomes too firm when refrigerated, sometimes decreasing spreadability. The open-tube melting point under increasing temperature of the low melting transesterified fat and oil is more preferably 20 to 28° C. and most preferably, 22 to 24° C.

As a palm based fat and oil as mentioned above, mention is made of palm oil, palm olein, two-step fractionated palm olein, palmstearin, middle melting point fraction of palm oil, or those obtained by hydrogenating, fractionating, and transesterifying these. The palm-based fats/oils mentioned above may be used singly or in combination of two or more types. Among the above described palm based fats and oils, palm oil and palm olein are preferably used.

The liquid-state fat and oil refers to a fat and oil present in a liquid state, at a temperature of 20° C., where no solid matter is visually observed. As an example of a liquid-state fat and oil, there can be mentioned rapeseed oil, soybean oil, corn oil, cottonseed oil, rice bran oil, safflower oil, sunflower oil, and the like. The liquid-state fats/oils mentioned above may be used alone or in combination of two or more.

The component (b) is a low melting transesterified fat and oil obtained by subjecting 40 to 90 parts by mass of a palm based fat and oil and 60 to 10 parts by mass of a liquid-state fat and oil to transesterification with a 1,3-position-specific lipase. When palm oil and/or palm olein is used as the palm based fat and oil, the ratio of the palm based fat and oil to the liquid fat and oil is preferably 40 to 80 parts by mass to 60 to 20 parts by mass, more preferably, 45 to 75 parts by mass to 55 to 25 parts by mass, further preferably, 50 to 70 parts by mass to 50-30 parts by mass, and most preferably, 60 to 70 parts by mass to 40-30 parts by mass.

Sources from which the 1,3-position-specific lipase is derived may not be particularly limited. The 1,3-position-specific lipase can be used even if it is derived from any sources including animal, plant and microorganism sources. As an example of lipase, there can be mentioned lipase derived from swine liver, lipases derived from soybean, rice bran and the like, and lipases derived from *Alcaligenes* sp., *Rhizopus* sp., *Mucor* sp., and the like. In particular, lipase from *Alcaligenes* sp. is preferably used by dispersing its powder as it is into a fat and oil raw material. The transesterification can be performed in a batch-type container equipped with a stirrer. Lipase may be used, for example, in an amount of 0.005 to 10% by mass of the mass of a fat and oil raw material. The transesterification is preferably performed at a temperature in the range of 30 to 130° C. for time of about 1 to 72 hours. Excessive transesterification is not preferable since randomization of a fatty acid of the 2-position takes place.

The moisture content of the fat and oil raw material to be used in the transesterification is preferably 5 to 1500 ppm, and more preferably 5 to 500 ppm. The excessive moisture content is not preferable since it is used in a hydrolysis reaction, decreasing the yield. Completion of the transesterification can be confirmed by determining the composition of a triglyceride contained in a reaction product by gas chromatography. The transesterification is terminated by removing an enzyme by filtration. The reaction product, that is, a low melting transesterified fat and oil, is washed with water and dried, and thereafter, discolored and deodorized according to the customary method. Note that lipase can be recovered by filtration and recycled.

Note that, in the present invention, the transesterified oil obtained in the manner mentioned above may be fractionated and put in use.

The content of the low melting transesterified fat and oil of the component (b) contained in the fat and oil phase of a fat and oil composition for spreads according to the present invention is preferably 5 to 50% by mass of the total mass of the fat and oil phase, more preferably 10 to 50% by mass, further preferably 10 to 40% by mass, and most preferably, 10 to 30% by mass.

In another aspect, the content of the low melting transesterified fat and oil of the component (b) contained in the fat and oil phase of a fat and oil composition for spreads according to the present invention is more preferably 5 to 40% by mass of the total mass of the fat and oil phase, further preferably 7 to 37% by mass, still further preferably 9 to 34% by mass, and most preferably, 9 to 29% by mass.

If the content of the low melting transesterified fat and oil of the component (b) is less than 5% by mass of the total mass of the fat and oil phase, oil-off may sometimes easily takes place. On the other hand, if the content exceeds 50% by mass, the composition becomes firmer during refrigeration and the spreadability decreases in some cases.

The component (c) will now be described. The component (c) is a solid-form fat and oil having an open-tube melting point under increasing temperature of 38° C. or more. If the open-tube melting point under increasing temperature is less than 38° C., the fat and oil composition for spreads becomes too soft when temperature rises, causing oil-off. The open-tube melting point under increasing temperature of the solid-form fat and oil to be used as the component (c) is preferably 38 to 60° C. If a solid-form fat and oil having an open-tube melting point under increasing temperature larger than 60° C., the fat and oil composition for spreads becomes too firm when refrigerated, sometimes decreasing spreadability. Thus, the open-tube melting point under increasing temperature of the solid-form fat and oil to be used as the component (c) is more preferably 38 to 55° C., further preferably, 38 to 50° C., still further preferably 38 to 49° C., further more preferably 38 to 48° C., and most preferably 43 to 47° C.

As the solid-form fat and oil of the component (c) the solid-form fat and oil can be used without limitation. For example, a solid-form fat and oil such as an animal fat and oil or a vegetable fat and oil having an open-tube melting point under increasing temperature of 38° C. or higher by itself can be used. Furthermore, use may be made of a hydrogenated, fractionated, or transesterified oil of an animal fat and oil, a vegetable fat and oil or the like, which originally had an open-tube melting point under increasing temperature of 38° C. or lower, but now has an open-tube melting point under increasing temperature of 38° C. or higher. Moreover, use may be made of a mixture of a fat and oil having an open-tube melting point under increasing temperature of 38° C. or more and such a hydrogenated, fractionated, or transesterified oil of a fat and oil originally having an open-tube melting point under increasing temperature of less than 38° C. but now having an open-tube melting point under increasing temperature of 38° C. or more. As an example of hydrogenated vegetable oil, there can be mentioned hydrogenated soybean oil and hydrogenated palm oil. When a mixture of oils is used as the component (c), as long as it has an open-tube melting point under increasing temperature of 38° C. or higher, it may be used.

As a solid-form fat and oil of the component (c) to be used in a fat and oil composition for spreads of the present invention, those having an open-tube melting point under increasing temperature of 38° C. or higher may be used alone or in combination of two or more. In addition, a hydrogenated oil, fractionated oil or transesterified oil having an open-tube melting point under increasing temperature of 38° C. or higher may be used in combination.

The content of the solid-form fat and oil of the component (c) contained in the fat and oil phase of a fat and oil composition for spreads according to the present invention is preferably 5 to 40% by mass of the total mass of the fat and oil phase, more preferably 7 to 38% by mass, still more preferably 10 to 35% by mass, further preferably 15 to 35% by mass, still further preferably 15 to 30%, further more preferably 20 to 30% by mass, and most preferably 22 to 28% by mass.

If the content of the solid-form fat and oil in the fat and oil phase of the component (c) is less than 5% by mass based on the total % by mass of the fat and oil phase, a sufficient firmness cannot be obtained and oil-off is easily taken place. On the other hand, if the content exceeds 40% by mass, oral solubility deteriorates, firmness increases during refrigeration and spreadability degrades in some cases.

The fat and oil composition for spreads according to the present invention is composed of a continuous fat and oil phase and a water phase. The fat and oil phase is the same as described above. The ratio of the fat and oil phase and the water phase in the fat and oil composition for spreads according to the present invention is not particularly limited and may be the same as that of a conventional fat and oil composition for spreads. For example, a water phase may be about 10 to 100 parts by mass, preferably 15 to 70 parts by mass, more preferably, 33 to 53 parts by mass relative to a fat and oil phase being 100 parts by mass.

The fat and oil composition for spreads according to the present invention may contain minor components and food additives as is contained in a conventional fat and oil composition for spreads. Such minor components and food additives may be those used in a conventional fat and oil composition for spreads, and more specifically those described in "the Japan Agriculture Standard for margarine and the like" (final edition, Sep. 3, 1997, Notification No. 1381 from the Ministry of Agriculture, Forestry and Fisheries of Japan).

As an examples of the minor components, there can be mentioned milk and a dairy product; seasoning (salt, vinegar); casein and vegetable protein; sugar; sugar alcohol; spice; honey, raw material for flavor; gelatin; indigestible dextrin and poly dextrose; starch; and dextrin.

Examples of the food additives include an emulsifier, emulsion stabilizer, acidulant, seasoning, quality improver, colorant, adhesive agent, antioxidant, flavoring, reinforcing agent, whey salt, and spice extract.

The aforementioned sub materials and food additives may be added depending upon desired flavor.

A container housing a fat and oil composition for spreads according to the present invention is not particularly limited. The fat and oil composition for spreads according to the present invention is delivered generally by putting it in a container such as a cup, portion package, or tube. When the amount to be housed in a container is large, a fat and oil composition for spreads is contained in a relatively large vinyl bag and further housed in a large box such as a corrugated carton box and then delivered.

Next, a fat and oil composition of the present invention will be described. A fat and oil composition of the present invention comprises (a) a liquid-state fat and oil containing, as a main ingredient, a triglyceride having fatty acids with 8 to 10 carbon atoms in an amount of not less than 10% by mass of the total constitutional fatty acids;

(b) a low melting transesterified fat and oil obtained by subjecting 40 to 90 parts by mass of a palm based fat and oil and 60 to 10 parts by mass of a liquid-state fat and oil to transesterification with a 1,3-position-specific lipase; and (c) a solid-form fat and oil having an open-tube melting point under increasing temperature of 38° C. or more.

The fat and oil composition of the present invention refers to a fat and oil phase of a fat and oil composition for spreads according to the present invention. The components of the fat and oil composition according to the present invention, their contents and the like are the same as described above.

The fat and oil composition of the present invention is used for producing a fat and oil composition for spreads such as margarine, prepared margarine, and fat spread.

Now, a suitable method for producing a fat and oil composition for spreads of the present invention will be described. A fat and oil composition for spreads of the present invention can be produced as follows.

First, 100 parts by mass of a fat and oil composition containing a liquid-state fat and oil of the component (a), a low melting transesterified fat and oil of the component (b), and a solid-form fat and oil of the component (c); 15 to 70 parts by mass of water; and if necessary, other sub materials are mixed, and then preparatorily emulsified. Thereafter, the resultant mixture is rapidly cooled and kneaded to obtain the fat and oil composition for spreads. As an example of the sub materials, there can be mentioned those usually blended in a conventional fat and oils composition for spreads.

A method of producing a fat and oil composition is not particularly limited. More specifically, components (a), (b) and (c) may be added at a time and, if necessary, order or speed for adding the components may be controlled.

Furthermore, when each component is composed of a plurality of oil ingredients, the oil ingredients are simultaneously added and then mixed with other components. More specifically, when a component (c) is composed of c1 fat and oil and c2 fat and oil, c1 and c2 fat and oil are mixed to prepare the component (c), which is thereafter mixed with components (a) and (b). Alternatively, components (a), (b), and c1 and c2 ingredients are mixed at a time.

EXAMPLES

The present invention will be described in more detail by way of examples, below. Such examples, however, are not to be construed as limiting in any way the scope of the present invention.

In the examples, the fat and oil composition for spreads was evaluated by the following tests.

<Method for Evaluating a Fat and Oil Composition for Spreads>

(1) Sensory Test

Three items: oral solubility, greasiness and spreadability were evaluated by 10 panelists (specialists).

Oral solubility and greasiness were evaluated as follows. A fat and oil composition for spreads was stored in a refrigerator. The fat and oil composition for spreads cooled to about 5° C. was taken out from the refrigerator. Immediately upon taking out, a predetermined amount of the composition was put into a mouth and evaluated. Oral solubility was checked on a 1 to 5 score basis by giving 5 points to a good one and 1 point to a bad one. Evaluation was made based on an average score of 10 panelists.

Greasiness, that is, greasy feeling when tasted, was checked on a 1 to 5 score basis by giving 5 points to a non-greasy case and 1 point to a greasy case. Evaluation was made based on an average score of 10 panelists.

Spreadability, more specifically, the degree of spreadability of a fat and oil composition for spreads in spreading on commercially available bread immediately after taking it out from a refrigerator, was checked on a 1 to 5 score basis by giving 5 points to an easy-to-spread case and 1 point to a difficult-to-spread case. Evaluation was made based on an average score of 10 panelists. The results of the sensory test are shown in Table 3.

(2) Determination of Corn Penetration (CP)

A CP value was determined in accordance with the customary method. This values is a criterion showing the firmness of a material at a given temperature. The larger the value, the softer the material is. The smaller the value, the firmer the material is. The measurement results are shown in Table 4.

(3) Oil-Off Test

After a fat and oil composition for spreads was stored at a temperature of about 5° C. for 20 hours, it was stored at a temperature of about 25° C. for 4 hours. This 24-hour storage was regarded as one cycle. This cycle was repeated for 8 weeks. A degree of oil-off was visually observed before the cycle was initiated, after one week, 2 weeks, 4 weeks and 8 weeks. Evaluation was performed in accordance with the following evaluation reference. Note that the phrase "visually observed before the cycle was initiated" means that the state of the composition was visually observed before it was placed under storage at about 5° C. The results are shown in Table 5. Note that only the fat and oil composition s for spreads of Example 2 and Comparative Example 4 were subjected to such an oil-off test.

−: Oil-off was not observed
+: Oil-off was observed
++: Oil-off was significantly observed (4) Determination of Solid Fat Content (SFC)

An SFC value of a fat and oil phase of a fat and oil composition for spreads was determined in accordance with the customary method.

(5) Method for Measuring Open-Tube Melting Point Under Increasing Temperature

An open-tube melting point under increasing temperature was measured in accordance with the measurement method defined in the Japanese Agriculture Standard.

More specifically, a capillary tube having a sample material prepared therein was brought into contact with a lower portion package of a thermometer. The lower ends of the capillary tube and the thermometer were placed on the same level. Subsequently, the thermometer was soaked in a beaker filled with distilled water. The water of the beaker was heated while stirring. The temperature at which the sample material starts rising in the capillary tube was defined as the open-tube melting point under increasing temperature. Measurement was performed by means of an automatic meting point measurer (manufactured by Elex Kagaku Kabushiki Kaisha, trade name "EX-871A").

Preparation Example 1

Preparation of Low Melting Transesterified Fat and Oil

First, 6 kg of palm oil (manufactured by The Nisshin OilliO Group, Ltd.) and 4 kg of rapeseed oil (manufactured by The Nisshin OilliO Group, Ltd.) were placed in a container equipped with a stirrer. The obtained oil mixture was stirred while heating at 60° C. Then, 100 g of 1,3 position specific lipase (Meito Sangyo Co., Ltd.) derived from *Alcaligenes* sp., was dispersed in the oil mixture while stirring. Stirring was performed for 10 hours while keeping the temperature of the mixture at 60° C. Thereafter, lipase was removed by filtration. The resultant mixture was purified in accordance with the customary method to obtain a low melting transesterified fat and oil. The open-tube melting point under increasing temperature of the obtained low melting transesterified fat and oil was 29.1° C.

Preparation Example 2

Preparation of Low Melting Transesterified Fat and Oil

A low melting transesterified fat and oil was obtained in the same way as in Preparation Example 1, except that 6.5 kg of palm oil (manufactured by The Nisshin OilliO Group, Ltd.) and 3.5 kg of rapeseed oil (manufactured by The Nisshin OilliO Group, Ltd.) were used. The open-tube melting point under increasing temperature of the obtained low melting transesterified fat and oil was 29.5° C.

Preparation Example 3

Preparation of Liquid-state Transesterification Fat and Oil

First, 8.8 kg of rapeseed oil (manufactured by The Nisshin OilliO Group, Ltd.), and 1.2 kg of a triglyceride (manufactured by The Nisshin OilliO Group, Ltd. under trade name: ODO, and containing about 75% by mass of a fatty acid having 8 carbon atoms and about 25% by mass of a fatty acid having 10 carbon atoms) were placed in a container equipped with a stirrer. The obtained oil mixture was heated to a temperature of 80° C. While the oil mixture was kept at 80° C, 20 g of sodium methylate was added, and stirred for 30 minutes. Thereafter, 500 g of ion-exchanged water was added to the oil mixture to terminate the reaction. After that, the oil mixture was washed with water, dewatered, and purified in accordance with the customary method to obtain a liquid-state transesterification fat and oil. In the obtained liquid-state transesterification fat and oil, which had a triglyceride, as a main ingredient, the content of fatty acids having 8 to 10 carbon atoms in the constituting fatty acids of the triglyceride was 10.5% by mass.

Example 1

As a component (a), 7,840 g of a triglyceride (manufactured by The Nisshin OilliO Group, Ltd. under trade name: ODO) was used. As a component (b), 2,660 g of the low melting transesterified oil obtained in Preparation Example 1 was used. As a component (c), 3,500 g of hydrogenated palm oil 45 (an open-tube melting point under increasing temperature: 45.8° C.) was used. The components (a), (b) and (c) were mixed, and 100 g of an emulsifier (monoglycerin fatty acid ester, lecithin) and 0.2 g of 30% β carotin were added and they were mixed while heating to obtain a fat and oil phase.

Subsequently, a water phase, in which sub materials (260 g of salt, 160 g of skimmilk powder, and 20 g of flavor) were dissolved in advance in a predetermined amount (5,460 g) of water with heating, was added to the fat and oil phase. In this manner, preparatory emulsification was performed at 60° C. for 20 minutes. Thereafter, the resultant mixture was kneaded while rapidly cooling through a combinater (manufactured by Schrader) to obtain a fat and oil composition for spreads of the present invention. Note that components and their contents of this Example are shown in Table 1, together with those of the following Examples and Comparative Examples.

The obtained fat and oil composition for spreads was evaluated in accordance with the "evaluation methods for a fat and oil composition for spreads" mentioned above.

Examples 2 to 7 and Comparative Examples 1 to 4

A transesterification fat and oil for spreading were obtained in the same way as in Example 1, except that components (a), (b) and (c) shown in Tables 1 and 2 were used in the contents shown in Tables 1 and 2. The obtained transesterification fat and oil for spreading were evaluated in the same manner as in Example 1. In all compositions, the mass ratio of a fat and oil phase to a water phase was set to be 7:3.

TABLE 1

|  |  | Example 1 | Example 2 | Example 3 | Example 4 | Example 5 | Example 6 | Example 7 | Example 8 |
|---|---|---|---|---|---|---|---|---|---|
| (a) Component | ODO | 55 | 65 | 10 | — | 56 | 56 | 56 | 56 |
|  | Product obtained in Preparation Example 3 | — | — | — | 55 | — | — | — | — |
|  | Rapeseed oil | — | — | 45 | — | — | — | — | — |
|  | Mixed bean/seed oil | — | — | — | — | — | — | — | — |
| (b) Component | Product obtained in Preparation Example 1 | 20 | 10 | 20 | 20 | 9 | — | — | — |
|  | Product obtained in Preparation Example 2 | — | — | — | — | — | 9 | 34 | 29 |
| (c) Component | Hydrogenated palm oil 45 | 25 | 25 | 25 | 25 | 25 | 25 | 10 | 15 |
|  | Palm oil | — | — | — | — | — | — | — | — |
|  | Hydrogenated soybean oil 40 | — | — | — | — | 10 | 10 | — | — |
|  | Hydrogenated soybean oil 34 | — | — | — | — | — | — | — | — |
| Content of fatty acid having 8 to 10 carbon atoms of component (a) |  | 100 | 100 | 18 | 10.5 | 100 | 100 | 100 | 100 |

TABLE 2

|  |  | Comparative Example 1 | Comparative Example 2 | Comparative Example 3 | Comparative Example 4 |
|---|---|---|---|---|---|
| (a) Component | ODO | — | — | — | — |
|  | Product obtained in Preparation Example 3 | — | — | — | — |
|  | Rapeseed oil | 55 | — | 60 | — |
|  | Mixed bean/seed oil | — | 65 | — | 50 |
| (b) Component | Product obtained in Preparation Example 1 | 20 | 10 | — | — |
| (c) Component | Hydrogenated palm oil 45 | 25 | 25 | — | — |
|  | Palm oil | — | — | 10 | 25 |
|  | Hydrogenated soybean oil 40 | — | — | 30 | — |
|  | Hydrogenated soybean oil 34 | — | — | — | 25 |
| Content of fatty acid having 8 to 10 carbon atoms of component (a) |  | 0 | 0 | 0 | 0 |

In Tables 1 and 2, rapeseed oil, mixed bean/seed oil, palm oil (an open-tube melting point under increasing temperature: 32.5° C.) and hydrogenated soybean oil 34 (an open-tube melting point under increasing temperature: 30.9° C.) were all manufactured by The Nisshin OilliO Group, Ltd. Hydrogenated palm oil 45 and hydrogenated soybean oil 40 were adjusted so as to have melting points under increased temperatures of 45.8° C. and 38.4° C., respectively in accordance with the customary method, and then put in use.

TABLE 3

|  | Example | | | | Comparative Example | | | |
| --- | --- | --- | --- | --- | --- | --- | --- | --- |
|  | 1 | 2 | 3 | 4 | 1 | 2 | 3 | 4 |
| Oral solubility | 4.8 | 4.5 | 4.2 | 4.5 | 2.5 | 2.6 | 3.0 | 3.2 |
| Greasiness | 4.9 | 4.6 | 4.1 | 4.4 | 2.9 | 2.9 | 2.5 | 3.0 |
| Spreadability | 5.0 | 5.0 | 4.2 | 5.0 | 3.1 | 3.8 | 3.5 | 2.6 |

As is apparent from Table 3, the fat and oil compositions for spreads of Examples 1 to 4, all exhibited good oral solubility and spreadability. In contrast, the compositions of Comparative Examples 1 to 4 devoid of component (a), were all inferior in oral solubility and spreadability to those of Examples 1 to 4.

Furthermore, the fat and oil composition for spreads of Examples 1 to 4 were all evaluated not greasy in a greasiness evaluation test; however, the compositions of Comparative Examples 1 to 4 were all evaluated to be greasier than Examples 1 to 4.

TABLE 4

| CP (° C.) | Example | | | | Comparative Example | | | |
| --- | --- | --- | --- | --- | --- | --- | --- | --- |
|  | 1 | 2 | 3 | 4 | 1 | 2 | 3 | 4 |
| 0 | 113 | 120 | 114 | 123 | 97 | 105 | 105 | 82 |
| 5 | 140 | 160 | 139 | 147 | 123 | 141 | 130 | 90 |
| 10 | 149 | 165 | 146 | 155 | 130 | 147 | 161 | 109 |
| 15 | 184 | 189 | 172 | 174 | 146 | 214 | 181 | 150 |
| Change from 5 to 15° C. | 44 | 29 | 33 | 27 | 23 | 73 | 51 | 60 |

As is apparent from Table 4, the CP values of Examples 1 to 4 at 5° C., which represent an analogous state of fat and oil compositions for spreads immediately upon taking out from a refrigerator, fall in 139 to 160 and the CP values of Comparative Examples 1 to 4 fall in 90 to 141. The fat and oil compositions for spreads of Examples 1 to 4 were likely softer than those of Comparative Examples 1 to 4. When temperature changed from 5 to 15° C., the firmness of the fat and oil compositions for spreads of Examples 1 to 4 changed in the range of 29 to 44 and the firmness of those of Comparative Examples 2 to 4 changed in the range of 51 to 73. From this, changes in firmness of the fat and oil compositions for spreads of Examples 1 to 4 were likely smaller. Note that the change in firmness of the fat and oil composition for spreads of Comparative Example 1 in the range of 5 to 15° C. was as small as 23; however, the composition was firmer than those of Examples 1 to 4 at any temperature in the range of 0 to 15° C.

TABLE 5

|  | 0 W | 1 W | 2 W | 4 W | 8 W |
| --- | --- | --- | --- | --- | --- |
| Example 2 | − | − | − | − | − |
| Comparative Example 4 | − | − | + | ++ | ++ |

As is apparent from Table 5, in the fat and oil composition for spreads of Example 2, no oil-off was observed until 8th week. In contrast, the fat and oil composition for spreads of Comparative Example 4, oil-off was observed at the 2nd week onward, and the degree of oil-off increased at 4th week and 8th week.

No significant difference was observed in the measurement results of the solid fat content, between the fat and oil compositions for spreads of Examples 1 to 4 and Comparative Examples 1 to 4. This fact suggests that the effect of the present invention cannot be produced by a composition whose physical properties are the same as those of a composition according to the present invention. The feature of the fat and oil composition for spreads according to the present invention resides in the formulation itself. The effect of the present invention can be produced by the formulation.

ADVANTAGES OF THE INVENTION

As is specifically described in the foregoing, a fat and oil composition for spreads according to the present invention comprises a specific fat and oil phase. Therefore, a fat and oil composition for spreads according to the present invention has good oral solubility and spreadability without greasiness.

The invention claimed is:
1. A fat and oil composition for spreads composed of a continuous fat and oil phase and a water phase, characterized in that the fat and oil phase comprises:
   (a) a liquid-state fat and oil containing, as a main ingredient, medium chain fatty acid triglycerides having fatty acids with 8 to 10 carbon atoms bound to the 1-, 2-, and 3-positions in an amount of not less than 10% by mass of the total constitutional fatty acids;
   (b) a low melting transesterified fat and oil prepared from 45-75 parts by mass of a palm based fat and oil wherein the palm based fat and oil comprises palm oil, palm olein, two-step fractionated palm olein, palmstearin, middle melting point fraction of palm oil, or those obtained by hydrogenating, fractionating, and transesterifying these, and 55 to 25 parts by mass of the liquid state fat and oil; and
   (c) a solid-form fat and oil having an open tube melting point under increasing temperature of 38° C. or higher.
2. The fat and oil composition for spreads according to claim 1, wherein the content of the liquid-state fat and oil (a) is 40 to 70% by mass of the total mass of the fat and oil phase, the content of the low melting transesterified fat and oil (b) is 5 to 50% by mass of the total mass of the fat and oil phase, and the content of the solid-form fat and oil (C) is 5 to 40% by mass of the total mass of the fat and oil phase.
3. The fat and oil composition for spreads according to claim 1, wherein the solid-form fat and oil (c) is an animal fat and oil or vegetable fat and oil, or a hydrogenated oil, fractionated oil or transesterified oil thereof.
4. The fat and oil composition for spreads according to claim 1, wherein the water phase is contained in the range of 10 to 100 parts by mass per 100 parts by mass of the fat and oil phase.

5. A fat and oil composition comprising:
(a) a liquid-state fat and oil containing, as a main ingredient, medium chain fatty acid triglycerides having fatty acids with 8 to 10 carbon atoms bound to the 1-, 2-, and 3-positions in an amount of not less than 10% by mass of the total constitutional fatty acids;
(b) a low melting transesterified fat and oil obtained by subjecting 40 to 90 parts by mass of palm based fat and oil wherein the palm based fat and oil comprises palm oil, palm olein, two-step fractionated palm olein, palm-stearin, middle melting point fraction of palm oil, or those obtained by hydrogenating, fractionating, and transesterifying these, and 60 to 10 parts by mass of a liquid-state fat and oil to transesterification with a 1,3-position-specific lipase; and
(c) a solid-form fat and oil having an open-tube melting point under increasing temperature of 38° C. or higher.

6. The fat and oil composition according to claim 5, wherein the content of the liquid-state fat and oil (a) is 40 to 70% by mass of the total mass of the fat and oil composition, the content of the low melting transesterified fat and oil (b) is 5 to 50% by mass of the total mass of the fat and oil composition, and the content of the solid-form fat and oil (c) is 5 to 40% by mass of the total mass of the fat and oil composition.

7. The fat and oil composition according to claim 5 for use in producing a fat and oil composition for spreads.

8. The fat and oil composition according to claim 6 for use in producing a fat and oil composition for spreads.

* * * * *